(12) United States Patent
Giorgetti et al.

(10) Patent No.: US 9,709,997 B2
(45) Date of Patent: Jul. 18, 2017

(54) CONTROL SYSTEM FOR GAS PRESSURE CONTROLLERS IN EXPLOSION RISK AREAS

(71) Applicant: AUTOMA-S.R.L., Ancona (IT)

(72) Inventors: Giorgio Giorgetti, Ancona (IT); Lorenzo Meme', Senigallia (IT)

(73) Assignee: AUTOMA-S.R.L., Ancona (AN) (IT)

( * ) Notice: Subject to any disclaimer, the term of this patent is extended or adjusted under 35 U.S.C. 154(b) by 0 days.

(21) Appl. No.: 14/899,943

(22) PCT Filed: May 21, 2014

(86) PCT No.: PCT/EP2014/060415
§ 371 (c)(1),
(2) Date: Dec. 18, 2015

(87) PCT Pub. No.: WO2014/206652
PCT Pub. Date: Dec. 31, 2014

(65) Prior Publication Data
US 2016/0139612 A1     May 19, 2016

(30) Foreign Application Priority Data

Jun. 28, 2013   (EP) .................................... 13425092

(51) Int. Cl.
    *F16K 31/04*            (2006.01)
    *G05D 16/06*            (2006.01)
    (Continued)

(52) U.S. Cl.
CPC ......... *G05D 16/0636* (2013.01); *F16K 31/04* (2013.01); *F16K 31/128* (2013.01); *F16K 31/1264* (2013.01); *G05D 16/2086* (2013.01)

(58) Field of Classification Search
CPC ............ G05D 16/0636; G05D 16/2086; F16K 31/128; F16K 31/1264; F16K 31/04
(Continued)

(56) References Cited

U.S. PATENT DOCUMENTS 2,924,105 A * 2/1960 Graham .................. F16K 31/04
                                           251/129.11
3,137,475 A * 6/1964 Schoenecker ......... F16K 31/047
                                           236/74 R (Continued)

OTHER PUBLICATIONS

International Search Report for corresponding International Application No. PCT/EP2014/060415.

(Continued)

*Primary Examiner* — John Bastianelli
(74) *Attorney, Agent, or Firm* — Egbert Law Offices, PLLC

(57) ABSTRACT

A control system for pressure controllers in explosion risk areas has a pressure controller with adjusting screw to control the pressure inside a conduit used to transport explosive gas. An adapter with a hole is adapted to receive the head of the adjusting screw. An electrical motor adapted to be used in risk explosion areas is provided with a driving shaft connected to the adapter. A support with body has a first end wherein a first hole is obtained to receive a shank of the pressure controller and a second end wherein a second hole is obtained to receive the adapter. A cable box connected to a telecommunication network is provided to remotely control the motor.

11 Claims, 4 Drawing Sheets

(51) Int. Cl.
*G05D 16/20* (2006.01)
*F16K 31/126* (2006.01)
*F16K 31/128* (2006.01)

(58) Field of Classification Search
USPC ............ 251/129.11–129.13, 264–278
See application file for complete search history.

(56) References Cited

U.S. PATENT DOCUMENTS

| | | | | |
|---|---|---|---|---|
| 4,265,270 A | * | 5/1981 | Satoh | G05D 16/0661 137/495 |
| 4,346,728 A | * | 8/1982 | Sulzer | F16K 29/00 137/243.6 |
| 4,556,193 A | * | 12/1985 | Yoshiga | F16K 31/04 251/129.11 |
| 4,650,156 A | * | 3/1987 | Kawahira | F16K 31/04 251/129.11 |
| 4,832,311 A | * | 5/1989 | Kimura | F16K 1/02 251/118 |
| 4,989,830 A | * | 2/1991 | Ratnik | E03B 9/02 251/129.11 |
| 5,364,066 A | * | 11/1994 | Dorste | F16K 1/38 251/122 |
| 6,953,084 B2 | * | 10/2005 | Greeb | E21B 34/02 166/332.1 |
| 2004/0134665 A1 | | 7/2004 | Greeb et al. | |
| 2012/0031499 A1 | | 2/2012 | Scott et al. | |
| 2013/0306893 A1 | * | 11/2013 | Naganuma | F02M 21/0242 251/129.11 |

OTHER PUBLICATIONS

Fairchild: "Model MP2400 Low Pressure M/P converter", Fairchild Industrial Products, Feb. 2, 2011 (Feb. 2, 2011), pp. 62-63, XP055086658, Retrieved from the Internet: URL:https://web.archive.org/web/2011020215 4605/http://fairchildproducts.com/pdf/MP24 00%20Low%20Pressure%20sheets.pdf [retrieved on Nov. 4, 2013].

* cited by examiner

CONTROL SYSTEM FOR GAS PRESSURE CONTROLLERS IN EXPLOSION RISK AREAS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a control system for pressure controllers, specifically to provide pressure control during production and transportation of explosive fluids. Such a control system is used with gas in areas classified as "explosion risk areas".

2. Description of Related Art Including Information Disclosed Under 37 CFR 1.97 and 37 CFR 1.98.

As it is known, gas conduits are provided with pressure controllers. A pressure controller generally comprises a control membrane that is compressed or decompressed to guarantee pressure control in the conduit downstream the pressure controller. Such compression and decompression of the pressure controller membrane can be made directly actuating on the pressure controller or through a pilot device connected to the pressure controller.

Such pressure controllers are generally actuated by means of a screw/bolt mechanism. The screw generally actuates on a spring of the pilot device or directly on a spring of the pressure controller.

The actuation of said pressure controllers is exclusively done manually, by means of a mechanical rotation on the screw/nut made by the operator using a specific tool.

In addition to being inaccurate, such a manual adjustment requires some time and does not permit immediate action in case of faults or anomalies. In view of the above, pressure control operations are only made once during the installation or maintenance of the pressure controller.

Moreover, being not equipped with an electronic interface, such a pressure controller cannot be provided with traditional remote control and its automatic actuation is not possible.

DE102008029008 disclose a pressure controller for explosion risk area consisting in a pneumatic valve which is controlled by means of a pressurized fluid flowing in a control duct.

Fairchild "Model MP2400 Low pressure M/P converter" discloses a pressure controller for explosion risk area provided with a motorized pilot. The pilot is integrated into the pressure controller and the pilot can not be applied to an existing pressure controller wherein the adjusting screw is manually actuated. The pilot of the model MP2400 is provided with a steeper motor having a driving shaft (range screw) pressing a spring. Therefore said model MP2400 is not provided with adaptor which is adapted to an adjusting screw. The stepper motor of the pilot is to be supplied with alternate voltage of 114 Vac. Said model of motorized pilot, such as other motorized pilots, has the drawback that it must have a dedicated electrical supply and it is not suitable for other different types of electrical power source.

U.S. Pat. No. 3,216,278 discloses a valve control mechanism comprising a plurality of gears and a clutch for selectively operating the mechanism by a motor drive or an hand-wheel.

The purpose of the present invention is to remedy the drawbacks of the prior art by providing a control system for pressure controllers that is efficient, effective, reliable and suitable to be used for fluids in explosion risk areas.

Another object of the present invention is to provide such a control system for pressure controllers which is versatile and suitable for existing pressure controllers wherein the adjusting screw is manually actuated.

Another object of the present invention is to provide such a control system for pressure controllers which is suitable for automatically driving and remote control.

Another object of the present invention is to provide such a control system for pressure controllers which is suitable for implants having different electrical power sources for the nominal value of the voltage and the type of electrical power (ac/dc).

BRIEF SUMMARY OF THE INVENTION

The control system of the invention comprises:
a pressure controller to control the pressure in a conduit that transports explosive gas, said pressure controller comprising:
a body adapted to be disposed in the conduit,
a flange connected to the body,
a shank protruding from the flange and having one end provided with a threaded hole,
an adjusting screw screwed into the threaded hole of the shank to control gas pressure, said adjusting screw comprising a head;
an adapter with body provided with hole adapted to receive the head of said adjusting screw;
a motor with driving shaft connected to said adapter to drive the adapter into rotation and cause the screwing/unscrewing of said adjusting screw, and
a support with body comprising a first end wherein a first hole is obtained to receive said shank of the pressure controller and a second end wherein a second hole is obtained to receive said body of the adapter, wherein said two holes are in communication,
wherein said motor is an electrical motor and the system also comprises a cable box electrically connected to the electrical motor, said cable box being connected to an electrical power supply to power the electrical motor and to a telecommunication/control network to remotely control the electrical motor.

The advantages of the control system of the invention are manifest, since it provides for automatic remote control of a manual pressure controller that can be used in the mining industry in the presence of firedamp and in surface industries in the presence of explosive gases and powders.

BRIEF DESCRIPTION OF THE DRAWINGS

Additional characteristics of the invention will appear evident from the detailed description below, with reference to the attached drawings, which only have an illustrative, not limitative purpose, wherein.

DETAILED DESCRIPTION OF THE INVENTION

Referring to the aforementioned figures, the control system of the invention is disclosed, generally indicated with numeral (1).

Figure 1:
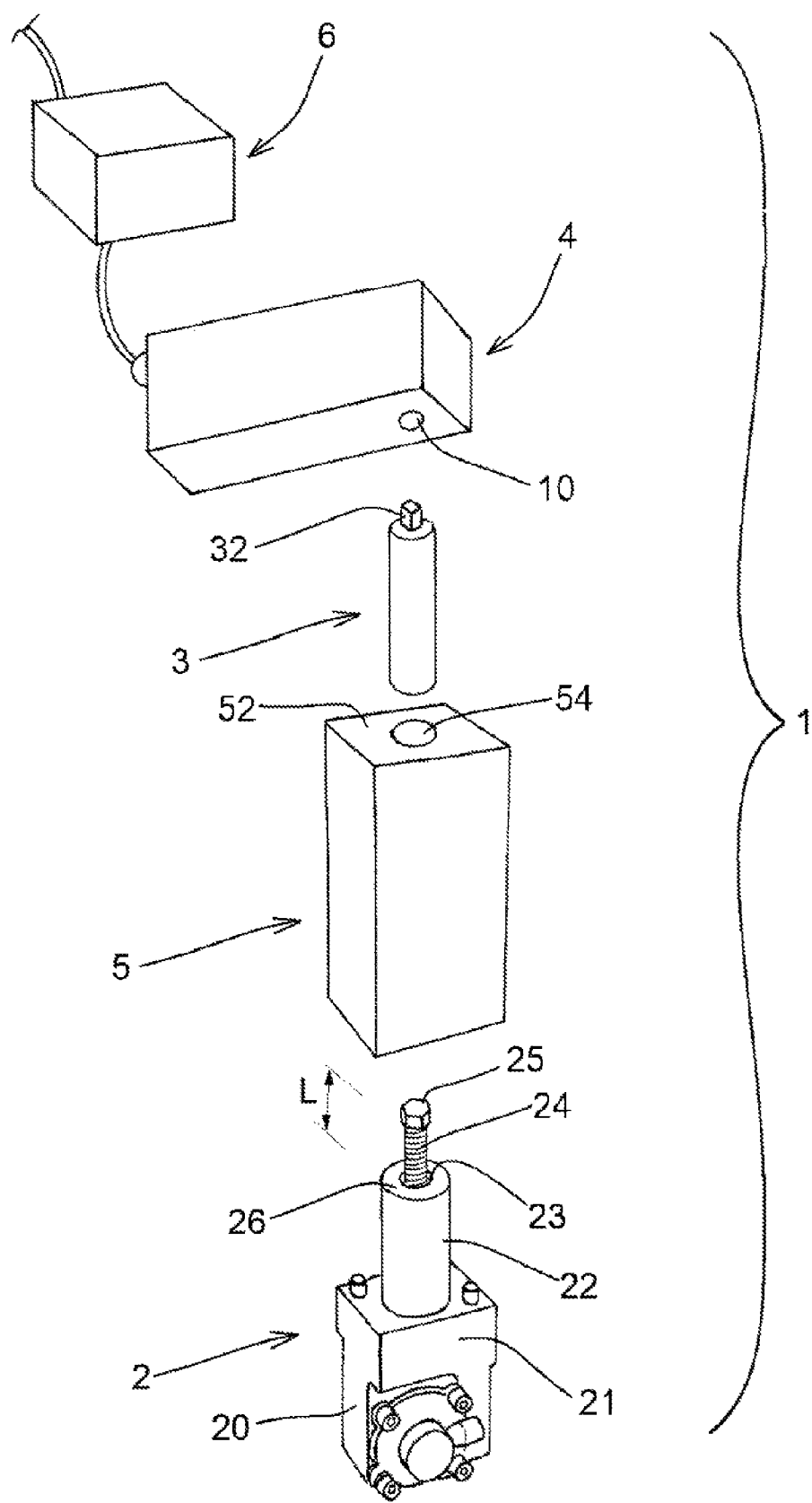
FIG. 1 is an exploded perspective view of the parts of the control system of the invention.
Figure 2:
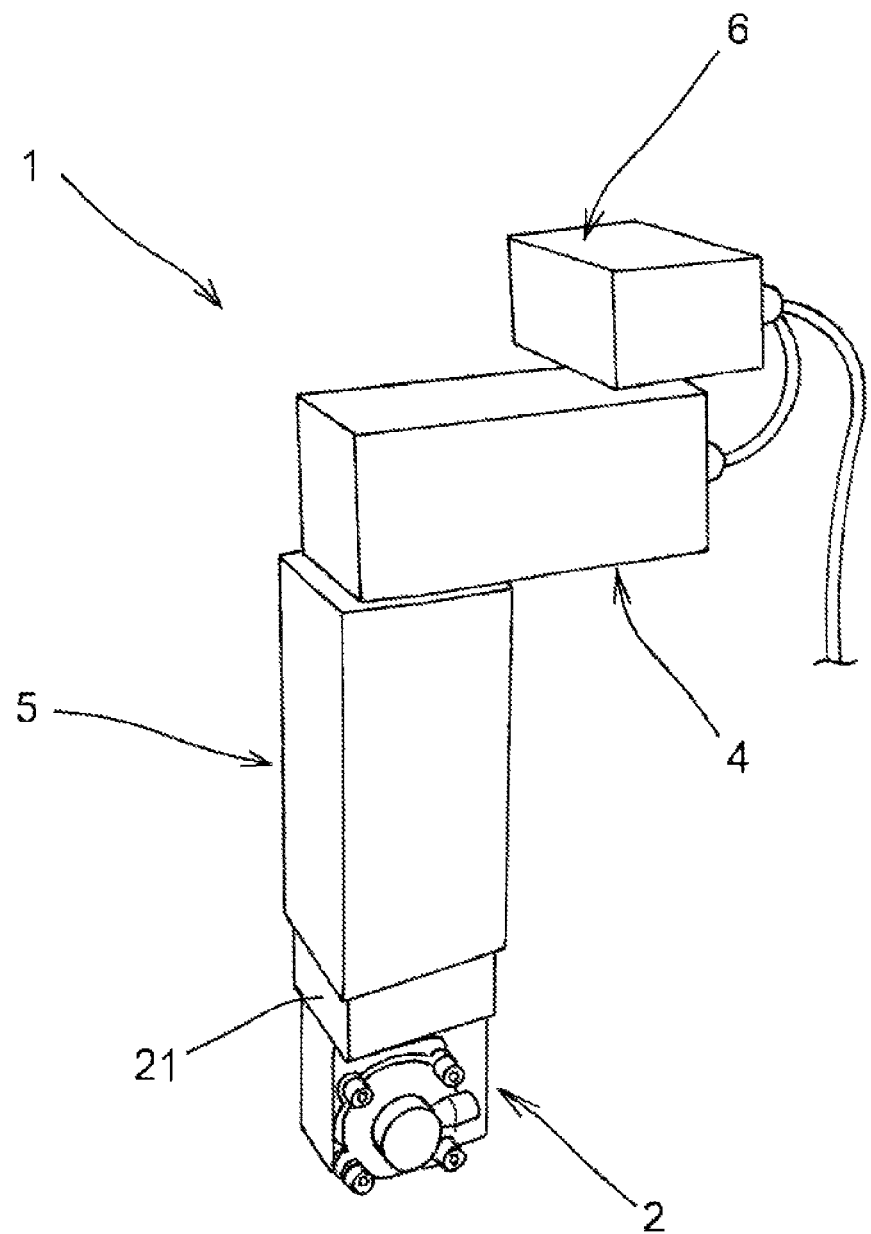
FIG. 2 is a view of the control system of FIG. 1 in assembled condition.

Referring now to FIG. 1, the control system (1) comprises:

a pressure controller (2) to control the pressure of an explosive gas flowing inside a conduit, an adapter (3) to adapt to the pressure controller (2), a motor (4) to actuate the adapter (3), a support (5) to support the adapter (3) and the motor (4).

The control system (1) comprises a wiring box (6) connected to the motor (4), if the power supply of the motor (6) is remote from the area where the pressure controller (2) is installed.

The pressure controller (2) is of known type and comprises a body (20) adapted to be inserted into a conduit where an explosive gas flows. A flange (21) is connected to the pressure controller body and a shank (22) protrudes from the flange (21) in such manner to be disposed externally to the gas conduit.

The shank (22) of the pressure controller is provided with one end (26) wherein a threaded hole (23) is obtained, axially extending inside the shank (22). An adjusting screw (24) is screwed into the threaded hole (23) of the shank. The adjusting screw (24) has a head (25) with polygonal, preferably hexagonal section.

The adjusting screw (24) pushes a spring or directly a membrane disposed inside the pressure controller that controls the pressure of the gas flowing inside the conduit. To increase the pressure, the adjusting screw (24) is screwed into the shank (22) and makes a screwing travel; on the contrary, to decrease the pressure, the adjusting screw (24) is unscrewed from the shank (22) and makes an unscrewing travel. The pressure increase or decrease operation according to the rotation direction of the screw/bolt has an illustrative, not limiting value.

The screwing and unscrewing travels of the adjusting screw (24) are controlled according to the minimum and maximum pressure values to be obtained, in such manner to define an end-of-screwing travel position and an end-of-unscrewing travel position. When the adjusting screw is at the end of the unscrewing travel, the upper end of the head (25) of the adjusting screw protrudes with respect to the end (26) of the shank by a maximum length (L) according to the pressure controller used.

Although for illustrative purposes the figures show a cylindrical shank (22), said shank (22) can have any shape or can be replaced by a pilot device wherein the adjusting screw is screwed. Being of a known type, the description of the pilot device is omitted.

Figure 3:
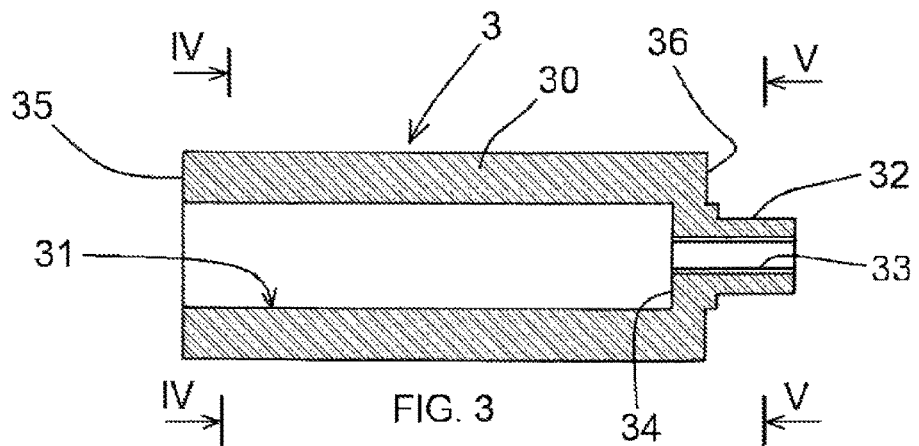
FIG. 3 is an axial sectional view of an adapter of the control system of FIG. 1.
Figures 4, 5:
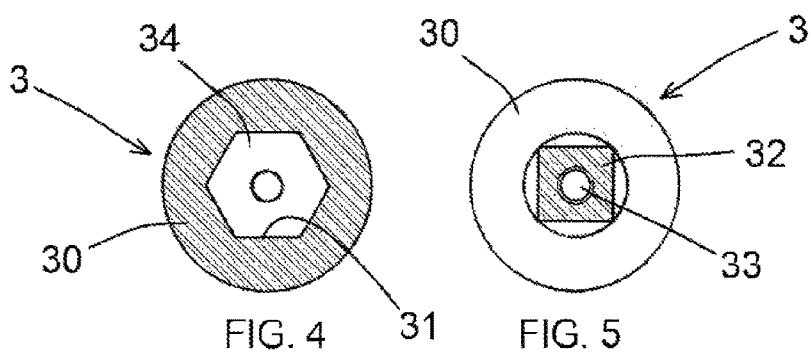
FIG. 4 and 5 are cross-sectional views respectively taken along sectional planes IV-IV and V-V of FIG. 3.

Referring to FIGS. 3, 4 and 5, the adapter (3) comprises a body (30) with a first end (35) and a second end (36). Preferably, the body (30) of the adapter is cylindrical. A hole (31) is obtained in the first end (35) of the adapter body, extending axially inside the adapter body. The hole (31) of the adapter body is suitably dimensioned to receive the head (25) of the adjusting screw/bolt. Since the head (25) of the adjusting screw has a polygonal, preferably hexagonal section, the hole (31) of the adapter body has a polygonal, preferably hexagonal section. The length of the hole (31) of the adapter body is suitably dimensioned to house the maximum protruding length (L) of the upper end of the head (25) of the adjusting screw with respect to the end (26) of the shank of the pressure controller, when the adjusting screw is at the end of the unscrewing travel.

A coupling pin (32) axially protrudes outwards from the second end (36) of the adapter body. The coupling pin (32) has a polygonal, preferably square section. A threaded hole (33) is obtained axially inside the coupling pin (32). The threaded hole (33) can be a blind hole or can be in communication with the hole (31) of the adapter body. In any case, the hole (33) of the coupling pin has lower dimensions than the hole (31) of the adapter, in such manner to generate a shoulder (34) at the end of the hole (31) inside the adapter body.

Going back to FIG. 1, the motor (4) comprises a driving shaft (10) that is engaged with the coupling pin (32) of the adapter. Screw means (not shown) are screwed into the threaded hole (33) of the coupling pin of the adapter in order to provide coupling with the driving shaft.

Figure 6:
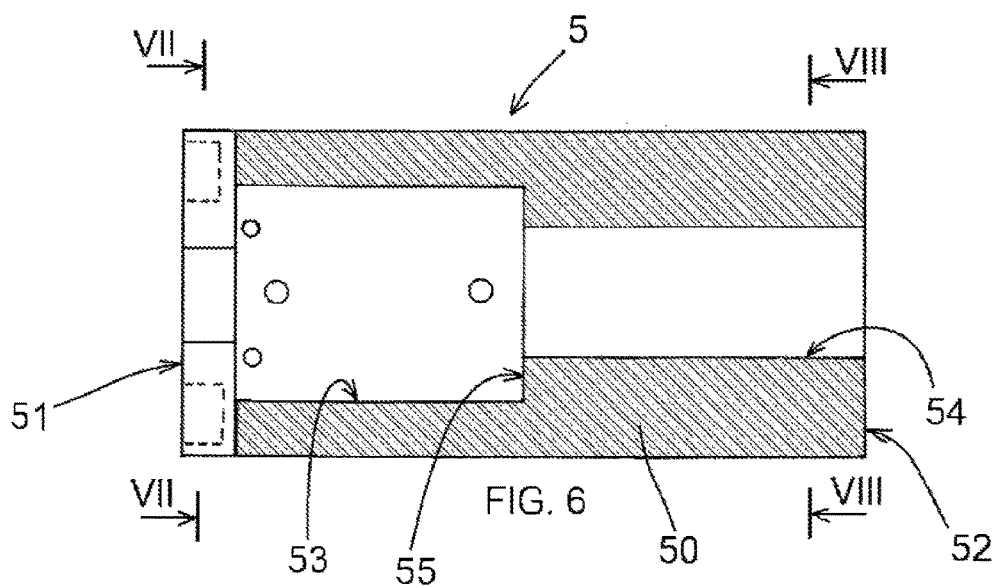
FIG. 6 is an axial sectional view of a support of the control system of FIG. 1.
Figure 7:
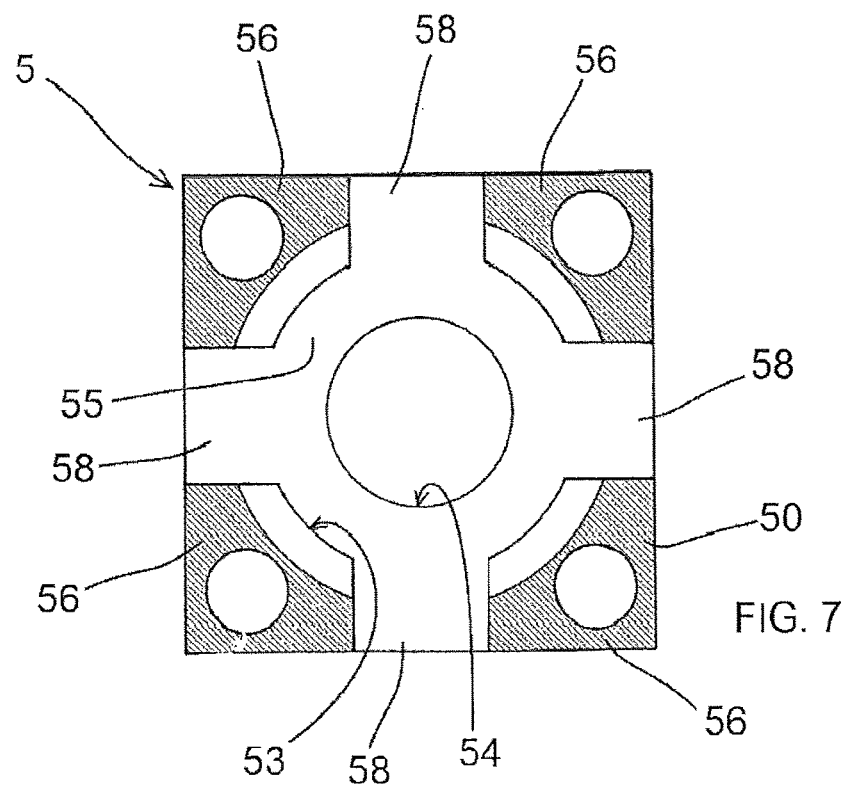
FIG. 7 and 8 are cross-sectional views respectively taken along sectional planes VII-VII and VIII-VIII of FIG. 6.
Figure 8:
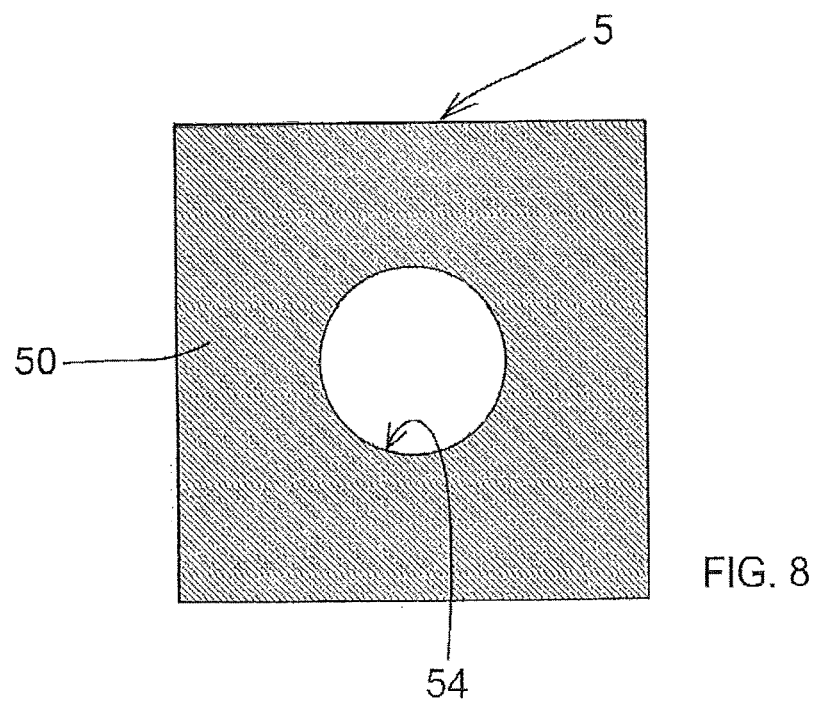

Referring to FIGS. 6, 7 and 8, the support (5) has a body (50) with a first end (51) and a second end (52). The body (50) of the support can be, for example, parallelepiped or cylindrical.

A first hole (52) is obtained axially in the first end (51) of the support body, and suitably dimensioned to receive the shank (22) of the pressure controller. If the shank (22) of the pressure controller is cylindrical, also the first hole (52) of the support is cylindrical.

A second hole (53) is obtained axially in the second end (52) of the support body, and suitably dimensioned to receive the body (30) of the adapter. If the body (30) of the adapter is cylindrical, also the second hole (52) of the support is cylindrical.

The two holes (53, 54) of the support are in communication in intermediate position of the support.

If the holes are cylindrical, the diameter of the first cylindrical hole (53) is higher than the diameter of the second cylindrical hole (54). Consequently, a shoulder (55) is generated in intermediate position inside the support.

Referring to FIG. 7, the first end (51) of the support is provided with four feet (56) disposed at the four corners of a square in order to be stopped against the flange (21) of the pressure controller. Each foot (56) is provided with a hole (65) to receive the bolts protruding from the flange of the pressure controller. Four passages (58) in cross configuration are defined between the four feet (56).

The adapter (3) and the support (5) are made of metal material, such as steel or aluminum. The adapter (3) and the support (5) can also be obtained from molding hard plastic materials, such as for example acrylonitrile-butadiene-styrene (ABS).

The motor (4) is of known type and is designed to be used in explosion risk areas. The motor (4) is an electrical motor, suitable to provide rotation of the driving shaft (40).

Preferably the motor (49) is a rotating electric motor having three positions, certified ATEX according to the recommendations of European directive 94/9/CE, with mixed protection methods of the type anti-explosion and intrinsic safety, to operate in environments having explosive gas or powders, i.e. areas classified with explosion risk.

In order to obtain a universal system for implants having different electric power sources (mains, battery, solar panels, etc.), the motor (4) comprises a power supply suitable to be supplied with a range of direct voltages from 24 to 240 $V_{DC}\pm0\%$ or alternate voltages from 24 to 240 $V_{AC}\pm10\%$ at a frequencies ranging from 50 to 60 Hz+20%. In this case the electronics of the motor (2) is act to recognize the voltage level applied to the motor and auto-adjusting the motor accordingly.

The motor (4), as it is supplied, can rotate in clockwise or anticlockwise according to the control signals sent by a remote control system. In order to rotate the motor (4) in clockwise or anticlockwise, the remote control system drives a switch electronic circuit of the motor connecting two electrical contacts of the motor (position 1) intended for the clockwise rotation or other two electrical contacts of the motor (position 2) intended for the anticlockwise rotation. When the motor is still, the motor is set in a rest position (position 3) wherein the electric contacts of the positions 1 and position 2 are disconnected.

Following is a description of the assembly and operation of the control system according to the present invention.

The support (5) is mounted on the pressure controller (2) in such manner that the shank (22) of the pressure controller is inserted into the first hole (53) of the support, until the end (26) of the shank of the pressure controller is stopped against the shoulder (55) of the support and the flange (21) of the pressure controller is stopped against the first end (51) of the support. In view the above, the adjusting screw (25) extends axially inside the second hole (54) of the support.

The adapter (3) is inserted into the second hole (54) of the support, in such manner that the head (25) of the adjusting screw is engaged inside the hole (31) of the adapter.

The coupling pin (32) of the adapter is coupled with the driving shaft (40). The motor (4) can be connected to the wiring box (6). The wiring box (6) is electrically connected to an electrical power supply source to power the electrical motor (4) and to a telecommunication/control network to remotely control the electrical motor (4).

In this way the motor (4) can be actuated from a remote station. The rotation of the driving shaft (40) in either direction causes the rotation of the adapter (3) and consequently the screwing or unscrewing of the adjusting screw (24), thus controlling the gas pressure automatically.

Numerous variations and modifications can be made to the present embodiment of the invention by an expert of the art, while still falling within the scope of the invention.

The invention claimed is:

1. A control system comprising:
   a pressure controller to control a pressure in a conduit that transports an explosive gas, said pressure controller comprising:
     a body adapted to be disposed in the conduit;
     a flange connected to said body;
     a shank or pilot device protruding from said flange and having an end provided with a threaded hole;
     an adjusting screw screwed into the threaded hole of the said shank or pilot device to control the pressure, said adjusting screw comprising a head; and
     an adapter having a body provided with a hole adapted to receive said head of said adjusting screw;
   a motor with a driving shaft connected to said adapter to drive said adapter into rotation and to cause a screwing or unscrewing of said adjusting screw, said motor being adapted to be used in an explosion risk area;
   a support with a body having a first end wherein a first hole receives said shank of said pressure controller and a second end wherein a second hole receives said body of said adapter, wherein said first and second holes are in communication, wherein said motor is an electrical motor; and
   a cable box electrically connected to said electrical motor, said cable box being connected to an electrical power supply to power said electrical motor and to a telecommunication and control network to remotely control said electrical motor.

2. The control system of claim 1, wherein said body of said adapter is cylindrical, wherein the shank of said pressure controller is cylindrical, and wherein said first hole of said support is cylindrical and said second hole of said support is cylindrical.

3. The control system of claim 2, wherein a diameter of said second hole of said support is less than a diameter of said first hole of said support such that a shoulder is defined in said support.

4. The control system of claim 1, wherein said head of said adjusting screw has a polygonal section and said hole of said body of said adapter has a polygonal section complementary to a perimeter of said head of said adjusting screw.

5. The control system of claim 4, wherein said head of said adjusting screw has a hexagonal section and said hole of said body of said adapter has a hexagonal section complementary to the perimeter of said head of said adjusting screw.

6. The control system of claim 1, wherein said hole of said body of said adapter has a length suitable for housing a maximum protruding length of an upper end of said head of said adjusting screw with respect to the end of said shank of said pressure controller when said adjusting screw is at an end of an unscrewing travel.

7. The control system of claim 1, wherein said adapter comprises a coupling pin axially protruding from said body of said adapter so as to be coupled with said driving shaft of said motor.

8. The control system of claim 7, wherein said coupling pin has a polygonal section.

9. The control system of claim 7, wherein said coupling pin has a threaded axial hole.

10. The control system of claim 1, wherein said electric motor comprises:
    a power supply supplied with a range of direct voltages from 24 to 240 $V_{DC}\pm10\%$ or alternate voltages from 24 to 240 $V_{AC}\pm10\%$ at frequencies ranging from 50 to 60 Hz+20%; and
    an electronics set that recognizes a voltage level applied to said motor and which auto-adjusts said motor accordingly.

11. The control system of claim 1, wherein said electric motor has a clockwise rotation position, a counterclockwise rotation position, and a still position.

* * * * *